United States Patent
He

(10) Patent No.: US 6,995,932 B1
(45) Date of Patent: Feb. 7, 2006

(54) THERMAL ASPERITY COMPENSATION IN PERPENDICULAR RECORDING SYSTEM

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 188 days.

(21) Appl. No.: 10/612,400

(22) Filed: Jul. 2, 2003

Related U.S. Application Data

(63) Continuation of application No. 09/850,039, filed on May 7, 2001, now abandoned.

(51) Int. Cl.
*G11B 5/02* (2006.01)

(52) U.S. Cl. .......................... 360/25; 360/46; 360/53; 360/45; 360/65; 360/31

(58) Field of Classification Search ................. 360/25, 360/46, 53, 45, 65, 31, 61, 63; 375/229, 375/230, 232, 233
See application file for complete search history.

(56) References Cited

U.S. PATENT DOCUMENTS

| | | | |
|---|---|---|---|
| 5,233,482 A | 8/1993 | Galbraith et al. | |
| 5,745,978 A | 5/1998 | Aboaf et al. | |
| 5,831,456 A | 11/1998 | Sutardja | |
| 5,920,449 A | 7/1999 | Tagawa | |
| 5,933,299 A | 8/1999 | Tanaka et al. | |
| 5,995,313 A | 11/1999 | Dakroub | |
| 6,005,726 A | 12/1999 | Tsunoda | |
| 6,040,953 A | 3/2000 | Malone et al. | |
| 6,101,054 A | 8/2000 | Tsunoda | |
| 6,104,557 A | 8/2000 | Kasai et al. | |
| 6,119,261 A | 9/2000 | Dang et al. | |
| 6,130,791 A | 10/2000 | Muto | |
| 6,130,793 A | 10/2000 | Ohmori et al. | |
| 6,137,643 A | 10/2000 | Flynn | |
| 6,147,827 A | 11/2000 | Southerland et al. | |
| 6,212,047 B1 | 4/2001 | Payne et al. | |
| 6,414,806 B1 * | 7/2002 | Gowda et al. | 360/25 |
| 6,501,610 B1 * | 12/2002 | Sugawara et al. | 360/65 |
| 2002/0060869 A1 | 5/2002 | Sawaguchi et al. | |

* cited by examiner

Primary Examiner—Alan T. Faber

(57) ABSTRACT

A detection circuit or a perpendicular recording system includes a channel circuit to amplify the read data signal. A transient detector generates a transient detect signal. A first path and a second path are coupled to an output of the channel circuit. The first path includes a first data detector that generates a first detected data signal in response to detecting data in the read data signal. A second path includes a series connected combination of a data filter and a second data detector. The filter generates a filtered data signal in which low frequency components of the read data signal are attenuated. The second data detector generates a second detected data signal in response to detecting data in the filtered data signal. Either the first detected data signal or the second detected data signal is coupled to a data processor based on whether a transient is detected.

77 Claims, 4 Drawing Sheets

THERMAL ASPERITY COMPENSATION IN PERPENDICULAR RECORDING SYSTEM

CROSS-REFERENCE TO RELATED APPLICATIONS

This application is a continuation of U.S. patent application Ser. No. 09/850,039, filed May 5, 2001, now abandoned. The disclosure of the above application is incorporated herein by reference in its entirety.

BACKGROUND OF THE INVENTION

The magnetic storage industry has been increasing the density storage capacity of hard drives with various technological advancements. Such advancements include perpendicular data storage as well as the use of magnetoresistive (MR) heads for pickup of data from the disk. An MR head includes an MR element made out of a material which changes electrical resistance depending on the strength of the magnetic field in which it lies. MR heads are known to suffer from a transient phenomenon commonly referred to as thermal asperity (TA) events. An MR head normally glides over a spinning magnetic disk close to, but not touching, the disk surface. When an MR head hits a protruding object on the disk surface, the MR element heats up rapidly and decays relatively slowly. The effect of such a transient phenomenon is a transient change in the baseline of the read-back signal coming from the MR head. See FIG. 1. This transient change contains a substantial low-frequency component and causes loss of read-back data. The extent of the read-back data lost to TA events depends on the robustness of the data detection system and the rate at which TA events occur.

In perpendicular recording systems, the rate of TA events is generally greater than in other data recording systems such as longitudinal recording systems. Perpendicular recording systems are a recent advancement in the data storage industry that potentially may provide much higher data storage densities than conventional recording systems. However, perpendicular recording systems are typically subject to an increased rate of TA events due to the relative close proximity of the recording head to the magnetic media that is typically required in this type of recording system. In addition, due to the closer relative distance between the recording head and the media, the heating of the recording head from the TA event is generally elevated over longitudinal recording systems. The increased heating translates into a transient of increased duration and amplitude in the output signal of the recording head. Therefore, the recording head signal of perpendicular recording systems typically includes both an increased rate of TA events and TA events having a longer duration. A data detection system for a perpendicular recording system without a transient detection and suppression circuit may lose a large amount of data, even to the point that the error correcting code used in the recording system cannot regenerate the user data.

SUMMARY OF THE INVENTION

A detection circuit and method for detecting data in a read data signal generated by a head of a perpendicular recording system is provided. The detection circuit includes a channel circuit to amplify the read data signal. A transient detector, in response to detecting a transient in the read data signal, generates a transient detect signal. A first path and a second path are coupled to an output of the channel circuit. The first path includes a first data detector that generates a first detected data signal in response to detecting data in the read data signal. The second path includes a series connected combination of a data filter and a second data detector. The filter generates a filtered data signal in which low frequency components of the read data signal are attenuated. The second data detector generates a second detected data signal in response to detecting data in the filtered data signal. A switch is controllable, in response to the transient detect signal, to couple either the first detected data signal or the second detected data signal to a data processor. The second detected data signal is coupled to the data processor when the transient detect signal indicates a transient is detected. The first detected data signal is coupled to the data processor when the transient detect signal does not indicate a transient is detected.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
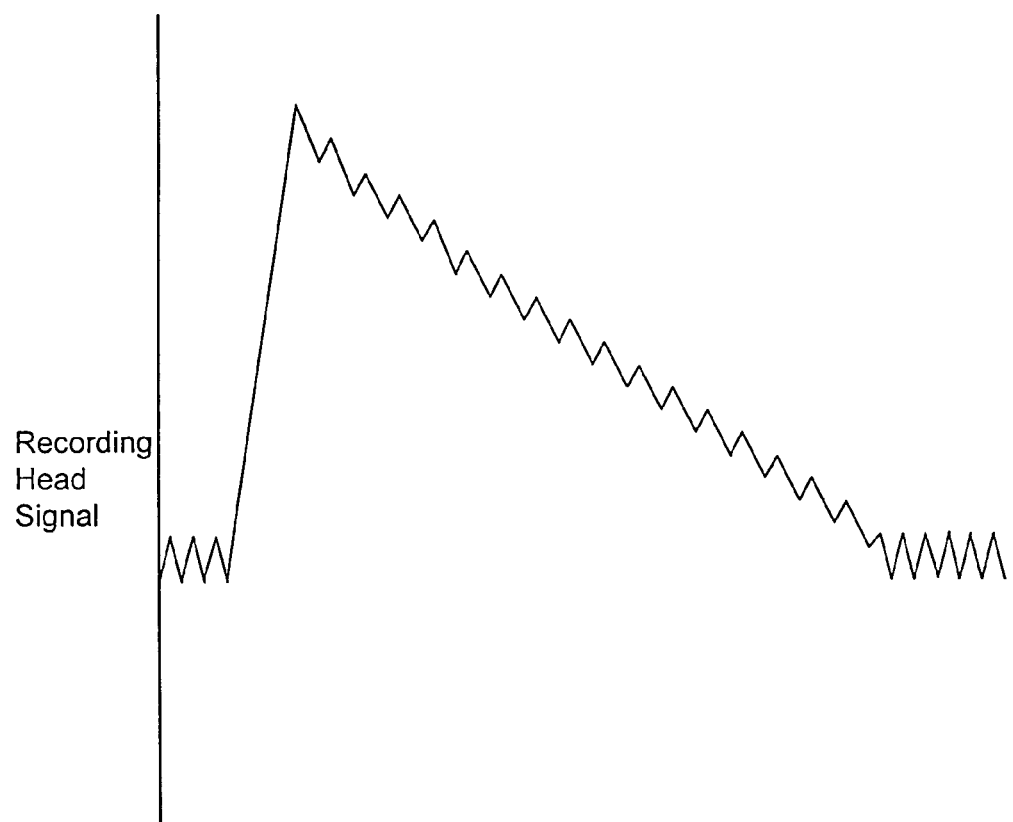
FIG. 1 illustrates a thermal asperity event.
Figure 2:
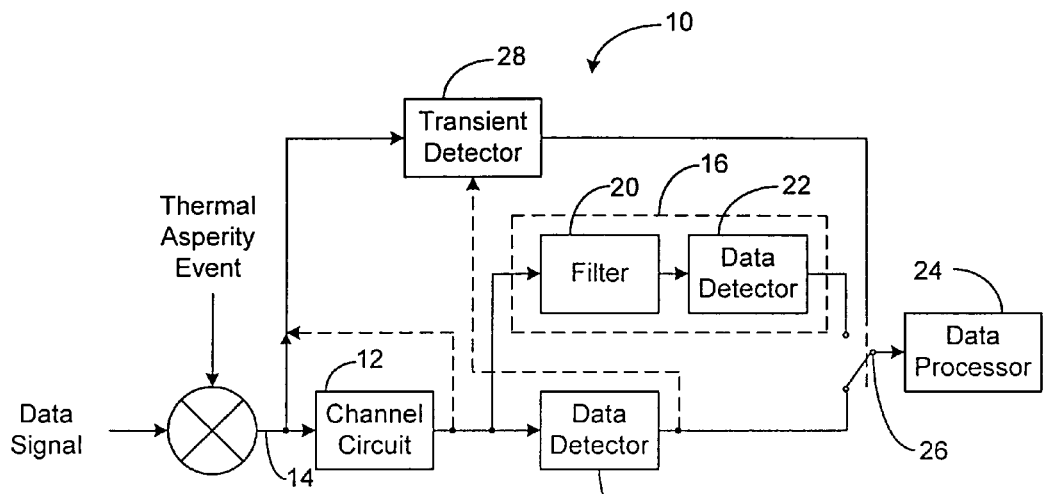
FIG. 2 illustrates a block diagram of an embodiment of a thermal asperity compensation system in accordance with the teachings of the present invention.

Referring to FIG. 2, a block diagram of an embodiment of a data detection system 10 is shown. The data detection system 10 eliminates errors in read back data caused by low frequency components in the read back signal of a perpendicular recording system. The data detection system is particularly suitable for use in a perpendicular recording system to eliminate errors in read back data caused by a TA event. Due to the closer proximity of the recording head to the magnetic media in a perpendicular recording system, TA events are typically more numerous and of greater severity. The increased severity is a result of elevated heating of the recording head during the TA event. The increased heating translates to a transient of increased duration and amplitude in the output signal of the recording head. Therefore, the recording head signal of perpendicular recording systems typically includes TA events that occur at an increased rate, and have a longer duration and greater amplitude. The data detection system 10 includes a discrete channel circuit 12 for interfacing with a perpendicular recording head (not shown) and amplifying the read data signal 14. It is within the scope of the invention for the channel circuit 12 to use analog, digital, or mixed-signal techniques. For example, an analog version of the channel circuit 12 may include a series combination analog preamplifier, filter, and analog forward equalizer. A digital version of the channel circuit 12 preferably includes a preamplifier with automatic gain control (AGC), a sampler, and a digital filer.

The read data signal includes the baseline data signal as well as noise components generated by thermal asperity events and spurious field coupling from noise sources. The optimal target response corresponding to the read data signal of a perpendicular recording system differs from that of a longitudinal recording system. In a perpendicular recording system the optimal target response generally does not have a DC zero since the data elements in the read data typically include a DC bias. Whereas, in a longitudinal recording system the optimal target response does have a DC zero since the data elements in the read data signal do not include a DC bias.

First and second detector circuits 16 and 18 are coupled to the output of the channel circuit 12 for generating output data signals during different operating phases of the data detection system 10. When a low frequency transient such as a TA event is detected, the output signal is taken from the output of the first detector circuit 16. During normal operation of the data detection system 10 in the absence of low frequency transients, the output signal is taken from the output of the second detector circuit 18.

The first detector circuit 16 includes a series connected high-pass filter 20 and data detector 22. The high-pass filter 20 attenuates low frequency components in the read data signal that are caused by the low frequency transient. By removing the low frequency components, the filtered read data signal contains substantially only the high frequency components corresponding to the desired data from the magnetic media in addition to an undesirable leading edge spike caused by the transient. It is within the scope of the invention to employ other filter configurations such as band pass filters and active filters that attenuate low frequency components. Preferably, the filter 20 is a digital implementation having a (1-D) filter characteristic such as $(1-0.5D-0.5D^2)$ and $(1-0.25D-0.25D^2-0.25D^3-0.25D^4)$ filters. However, the principles of the invention encompass analog filters as well as digital implementations. The data detector 22 detects the read data pulses in the filtered read data signal. Preferably, a decision feedback equalizer (DFE) is used as the data detector 22 since DFEs provide acceptable implementation complexity. The scope of the invention includes using other detectors such as partial-response maximum likelihood (PRML) detectors and Viterbi detectors for the data detector 22. The first detector circuit 16 is used primarily to process segments of the read data signal that may include low frequency components. The output from the data detector 22 is coupled to a data processor 24 through a switch 26 during segments of the read data signal that include a detected transient.

The second detector circuit 18 preferably employs a Viterbi detector, however the scope of the invention includes using other detectors such as DFE and PRML detectors. As those skilled in the art know, a Viterbi detector is particularly suitable and achieves optimal error rates when the noise present in the data signal can be characterized as being a stationary, white Gaussian process. The second detector circuit 18 is primarily used to process segments of the read data signal that do not include low frequency components associated with a transient such as a TA event. In particular, the read data signal segments may be characterized as preferably containing substantially stationary white Gaussian noise. The output of the detector 18 is coupled through the switch 26 to the processor 24 during segments of the read data signal that do not include a detected transient. It is also within the scope of the invention to disable the detector 18 during a transient such as by decoupling the read data signal from the input.

A transient detector 28 monitors the read data signal for transients, and in response to detecting a transient generates a transient detect signal. Preferably the transient detector 28 monitors the read data signal at the input to the channel circuit 12. However, the scope of the invention includes monitoring the read data signal either at the output or within the channel circuit 12. The scope of the invention also includes monitoring the read data signal at multiple points within the data detection system 10. The transient detector 28 preferably generates the transient detect signal in response to detecting a transient having a low frequency component such as DC. Such a transient may have a fast rising leading edge such as that generated by a TA. The trailing edge of the transient detect signal is determined by one of several methods such as delaying for a predetermined time period following the detection of the leading edge of the transient, monitoring the level of the transient to determine whether the level is less than a threshold, using a combination of time and level monitoring, and monitoring the output of the second data detector 18. For example, a delay time may be selected as a function of the maximum amplitude of the transient, so that given a larger amplitude transient, the delay time defining the trailing edge is increased. The transient detect signal controls the operation of the switch 26 so that during a transient an output signal from the first detector 16 is coupled to the data processor 24.

Figure 3:
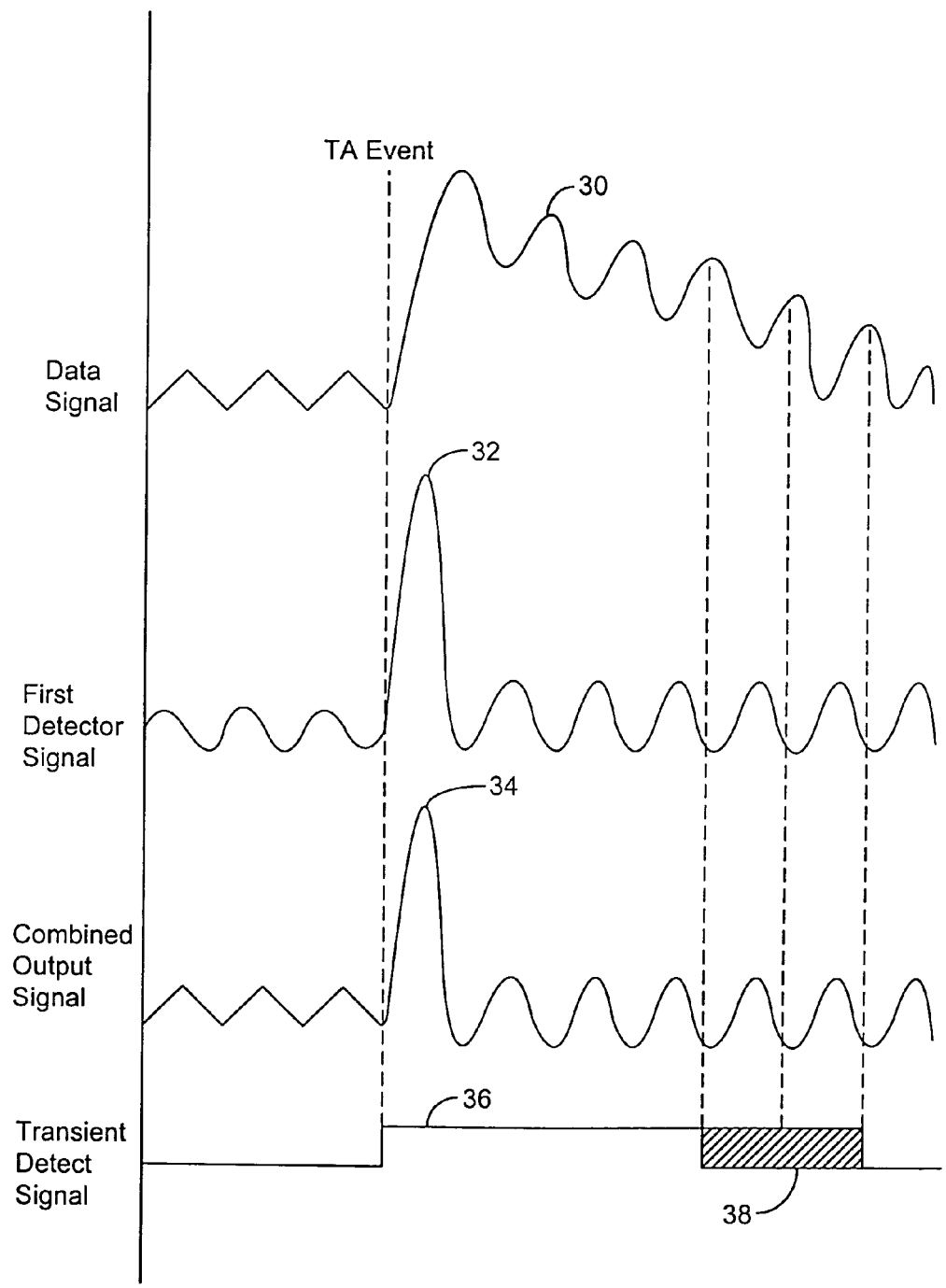
FIG. 3 illustrates a set of waveforms corresponding to the presently preferred embodiment of the thermal asperity compensation system.

Referring to FIG. 3, a set of waveforms corresponding to the data detection system 10 is illustrated. The first waveform 30 shows the data signal that is output from the channel circuit. The second waveform 32 shows the first detector signal. The third waveform 34 shows the combined output signal from the detectors 18 and 22 that is coupled into the data processor 24. The fourth waveform 36 shows the transient detect signal from the transient detector. The hashed portion 38 of the fourth waveform 36 indicates the preferable transition point for the transient detect signal back to steady-state operation. Preferably, the portion of the combined output signal comprised of the output from the first data detector 16 is limited to the period of time during which the output of the second data detector 18 provides inaccurate data. During non-transient operation the second data detector output provides more accurate data than the first data detector output, since there is no series filter to introduce some distortion into the data.

Figure 5:
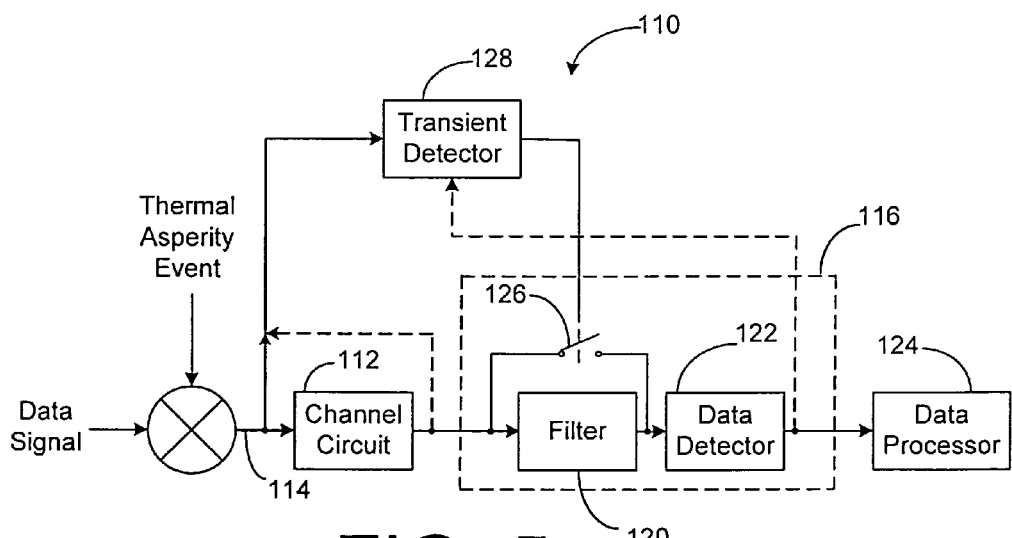
FIG. 5 illustrates a block diagram of an alternative embodiment of a thermal asperity compensation system in accordance with the teachings of the present invention.

Referring to FIG. 5, a block diagram of a less preferred alternative embodiment of a data detection system 110 is shown. The data detection system 110 is similar to data detection system 10 in function with corresponding elements numbered from 112 to 128, except that only one data detector 122 is required, and switch 126 is connected in parallel with filter 120. In operation, the transient detector 128 sets the switch 126 to the closed position to short out filter 120 during time periods when a TA event is not present in the read qqqdata signal. During time periods when a TA event is present, the transient detector 128 sets the switch 126 to the open position so that low frequency components in the read data signal 114 are filtered by the filter 120.

Preferably, the transient detector 128 is a DFE detector, however using other detectors such as Viterbi detectors is also envisioned.

Figure 4:
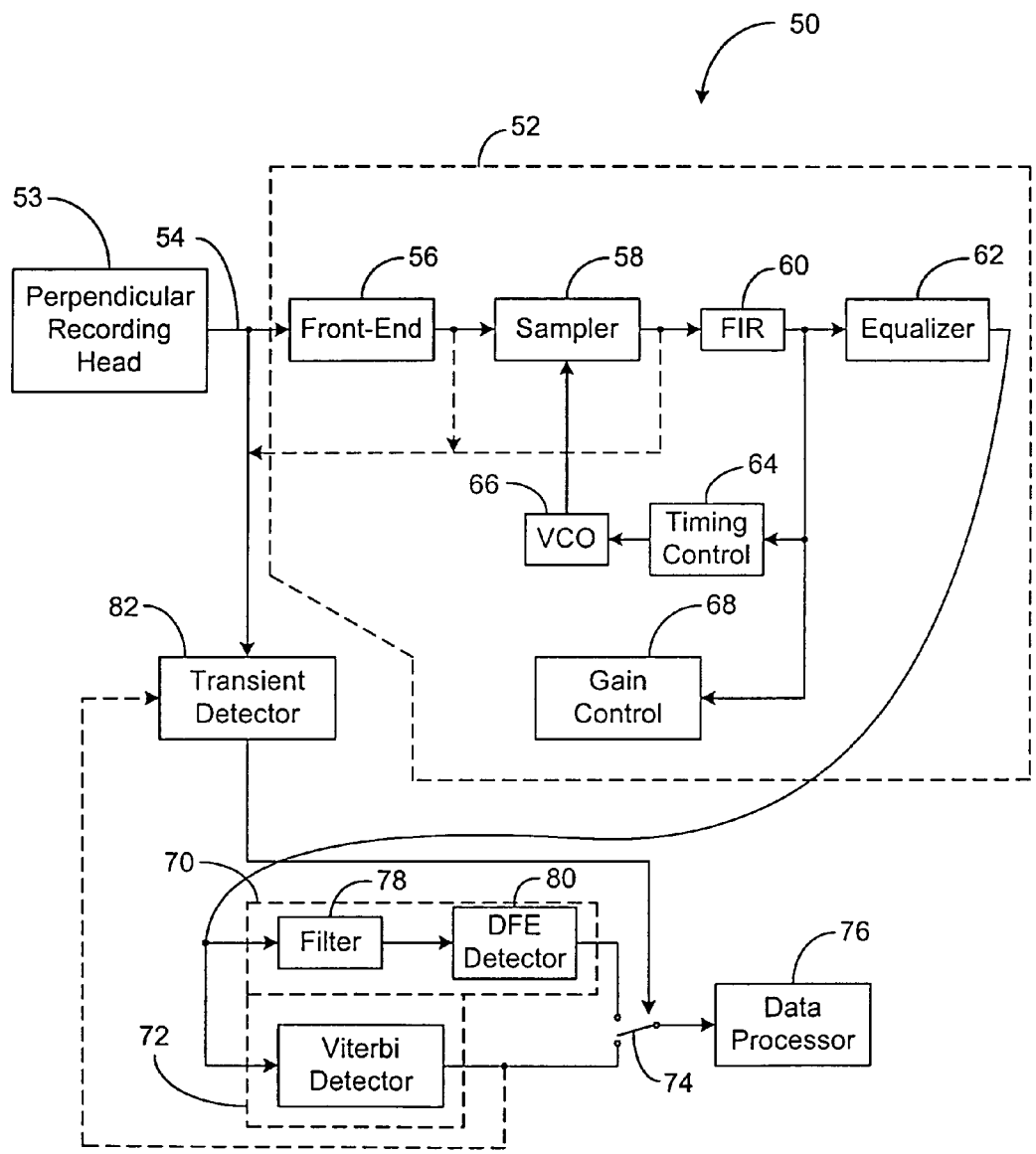
FIG. 4 illustrates a block diagram of a presently preferred embodiment of the thermal asperity compensation system in accordance with the teachings of the present invention.

Referring to FIG. 4, an embodiment of a data detection system 50 based on digital techniques is illustrated. The data detection system 50 includes a discrete channel circuit 52 for amplifying a read data signal 54 that is generated by a perpendicular recording head 53. The read data signal 54 includes the baseline data signal as well as noise components generated by thermal asperity events and spurious field coupling from noise sources. The channel circuit 12 includes a front-end 56 for interfacing with the perpendicular recording head 53. A sampler 58 extracts samples from the read data signal 54. A Finite-Impulse Response (FIR) filter 60 attenuates out-of-band noise components in the read data signal 54. An equalizer 62 removes intersymbol interference from the filtered read data signal 54. Timing control 64 and a voltage controlled oscillator 66 provide control signals to the sampler 58. A gain control 68 adjusts the gain of the front-end 56 to maintain a relatively constant amplitude pulse at the output of the FIR filter 60.

First and second detector circuits 70 and 72 are coupled to the output of the equalizer 62 for generating output data signals that are selectively routed through a switch 74 to a data processor 76. The output of the second detector circuit 72 is routed to the data processor 76 during normal operation. During time periods when a TA event is detected in the read data signal, the output of the first detector circuit 70 is routed to the data processor 76.

The first detector circuit 70 includes a series connected high-pass filter 78 and DFE detector 80. The first detector circuit 70 processes segments of the read data signal that may include low frequency components. The second detector circuit 72 is preferably a lone Viterbi detector.

A transient detector 82 monitors the read data signal at the output of the front-end 56 for transients. In response to detecting a transient, the transient detector 82 generates a transient detect signal that controls the switch 74. The transient detector 28 generates the transient detect signal in response to detecting a transient generated by a TA event. Such a transient typically has a fast rising leading edge combined with a slowly decaying low frequency component related to the thermal time constant of the TA event. The transient detect signal remains active until the level of the transient in the read data signal decays to less than a predetermined threshold.

The description of the invention is merely exemplary in nature and, thus, variations that do not depart from the gist of the invention are intended to be within the scope of the invention. The present invention is preferably implemented as an integrated circuit, it is contemplated that the present invention may also be implemented as discrete components or a general-purpose processor operated in accordance with program code instructions or computer program or combination thereof. These program code instructions can be obtain from a medium, such as network, local area network, the Internet, or storage devices. Such storage devices include, by way of example, magnetic storage devices, optical storage devices, electronic storage devices, magneto-optical device and the like. Such variations are not to be regarded as a departure from the spirit and scope of the invention.

What is claimed is:

1. A detection circuit for detecting data in a read data signal generated by a head of a perpendicular recording system, the read data signal including at least one of data and transients, a transient detect signal indicative of one of the transients, the detection circuit comprising:
   a first path comprising a filter and a first data detector responsive to the filter;
      the filter to generate a filtered data signal in which low frequency components of the read data signal are attenuated;
      the first data detector, operable for detecting data in the filtered data signal, to generate a first detected data signal;
   a second path including a second data detector, operable for detecting data in the read data signal, to generate a second detected data signal; and
   a switch, controllable in response to the transient detect signal, to select either the first detected data signal when the transient detect signal indicates a transient is detected or the second detected data signal to a data processor when the transient detect signal does not indicate a transient is detected.

2. The detection circuit of claim 1 further including a forward equalizer for attenuating intersymbol interference in the read data signal.

3. The detection circuit of claim 1 wherein the first data detector is a DFE detector.

4. The detection circuit of claim 1 wherein the second data detector is a Viterbi detector.

5. The detection circuit of claim 1 wherein the filter has a high pass filter characteristic.

6. The detection circuit of claim 1 wherein the filter has a 1-D filter characteristic.

7. The detection circuit of claim 1 further including a transient detector, responsive to the transient in the read data signal, to generate the transient detect signal.

8. The detection circuit of claim 1 wherein the second data detector is disabled during the transient.

9. The detection circuit of claim 1 wherein the first data detector is a DFE detector;
   wherein the second data detector is a Viterbi detector; and
   wherein the data filter has a high pass filter characteristic.

10. A method of detecting data in a read data signal generated by a head of a perpendicular recording system, comprising the steps of:
   monitoring the read data signal for a transient;
   attenuating low frequency components in the read data signal such that a filtered data signal is generated;
   detecting data in the filtered data signal; and
   generating a first detected data signal from the filtered data signal;
   detecting data in the read data signal; and
   generating a second detected data signal from the read data signal;
   in response to detecting the transient, generating a transient detect signal; and
   selecting either the first detected data signal or the second detected data signal based upon the transient detect signal.

11. The method of claim 10 further including the step of attenuating intersymbol interference in the read data signal.

12. The method of claim 10 further including the step of converting the read data signal to digitized data.

13. The method of claim 10 further including the step of decoupling the read data signal from the first detector during a transient.

14. A detection circuit for detecting data in a read data signal generated by a head of a perpendicular recording system, comprising:

means for detecting a transient in the read data signal, to generate a transient detect signal;

first data detecting means responsive to the read data signal, for attenuating low frequency components of the read data signal and detecting data in the read data signal, to generate a first detected data signal;

second data detecting means coupled to an output of the channel circuit for detecting data in the read data signal, to generate a second detected data signal; and switch means for selecting either the first detected data signal when the transient detect signal indicates a transient is detected or the second detected data signal to a data processor when the transient detect signal does not indicate a transient is detected.

15. The detection circuit of claim 14 further including a means for attenuating intersymbol interference in the read data signal.

16. The detection circuit of claim 14 wherein the first data detecting means includes filtering means for attenuating low frequency components in the read data signal and a DFE detector.

17. The detection circuit of claim 16 wherein the filtering means has a high pass filter characteristic.

18. The detection circuit of claim 14 wherein the second data detecting means is a Viterbi detector.

19. The detection circuit of claim 14 wherein the second data detecting means is disabled during the transient.

20. The detection circuit of claim 14 wherein the transient detecting means delays a predetermined time period after the transient before resetting the transient detect signal to indicate no transient is detected.

21. A detection circuit for detecting data in a read data signal generated by a head of a perpendicular recording system, comprising:

a transient detector, responsive to detecting a transient in the read data signal, to generate a transient detect signal;

a data filter, responsive to the read data signal, to generate a filtered data signal in which low frequency components of the read data signal are attenuated;

a data detector, operable to detect data in either the read data signal or the filtered data signal, to generate a detected data signal; and a switch, controllable in response to the transient detect signal, to bypass the data filter when the transient detect signal does not indicate a transient is detected.

22. The detection circuit of claim 21 further including a channel circuit to amplify the read data signal.

23. The detection circuit of claim 21 wherein the data detector is selected from the group of DFE detectors and Viterbi detectors.

24. The detection circuit of claim 21 wherein the data filter has a high pass filter characteristic.

25. The detection circuit of claim 22 wherein the channel circuit includes:

a sampler to convert the read data signal to a digitized signal; and a finite impulse response filter to filter the digitized signal.

26. The detection circuit of claim 21 wherein the transient detector, further in response to detecting approximately an absence of the transient in the first detected data signal, sets the transient detect signal to indicate no transient is detected.

27. A detection circuit for detecting data in a read data signal generated by a head of a perpendicular recording system, comprising:

means for detecting a transient in the read data signal, to generate a transient detect signal;

means for filtering, responsive to the read data signal, for generating a filtered data signal;

detecting means for detecting data in either the filtered data signal or the read data signal, to generate a detected data signal; and means for switching being controllable in response to the transient detect signal, to bypass the filtering means when the transient detect signal does not indicate a transient is detected.

28. The detection circuit of claim 27 further including a means for amplifying the read data signal.

29. The detection circuit of claim 27 wherein the first data detecting means includes filtering means for attenuating low frequency components in the read data signal and a DFE detector.

30. The detection circuit of claim 29 wherein the filtering means has a high pass filter characteristic.

31. The detection circuit of claim 27 wherein the detecting means is selected from the group of DFE a detector and a Viterbi detector.

32. The detection circuit of claim 27 wherein the transient detecting means delays a predetermined time period after the transient before resetting the transient detect signal to indicate no transient is detected.

33. A computer program of detecting data in a read data signal generated by a head of a perpendicular recording system, comprising the steps of:

monitoring the read data signal for a transient;

attenuating low frequency components in the read data signal such that a filtered data signal is generated;

detecting data in the filtered data signal; and generating a first detected data signal from the filtered data signal;

detecting data in the read data signal; and generating a second detected data signal from the read data signal;

in response to detecting the transient, generating a transient detect signal; and selecting either the first detected data signal or the second detected data signal based upon the transient detect signal.

34. The computer program of claim 33 further including the step of attenuating intersymbol interference in the read data signal.

35. The computer program of claim 33 further including the step of converting the read data signal to digitized data.

36. The computer program of claim 33 further including the step of decoupling the read data signal from the first detector during a transient.

37. A detection circuit for detecting data in a read data signal generated by a head of a perpendicular recording system, comprising:

a transient detector to detect a transient in the read data signal, to generate a transient detect signal;

a first path comprising a filter and a first data detector responsive to the filter;

the filter to generate a filtered data signal in which low frequency components of the read data signal are attenuated;

the first data detector, operable for detecting data in the filtered data signal, to generate a first detected data signal;

a second path including a second data detector, operable for detecting data in the read data signal, to generate a second detected data signal; and a switch, controllable in response to the transient detect signal, to select either the first detected data signal when the transient detect signal indicates a transient is detected or the second detected data signal to a data processor when the transient detect signal does not indicate a transient is detected.

38. The detection circuit of claim 37 further including a forward equalizer for attenuating intersymbol interference in the read data signal.

39. The detection circuit of claim 37 wherein the first data detector is a DFE detector.

40. The detection circuit of claim 37 wherein the second data detector is a Viterbi detector.

41. The detection circuit of claim 37 wherein the filter has a high pass filter characteristic.

42. The detection circuit of claim 37 wherein the filter has a 1-D filter characteristic.

43. The detection circuit of claim 37 further including a channel circuit to amplify the read data signal.

44. The detection circuit of claim 37 wherein the second data detector is disabled during the transient.

45. The detection circuit of claim 37 wherein the first data detector is a DFE detector;
wherein the second data detector is a Viterbi detector; and
wherein the filter has a high pass filter characteristic.

46. A detection circuit for detecting data in a read data signal generated by a head of a perpendicular recording system, the read data signal including at least one of data and transients, a transient detect signal indicative of one of the transients, the detection circuit comprising:
first data detecting means responsive to the read data signal, for attenuating low frequency components of the read data signal and detecting data in the read data signal, to generate a first detected data signal;
second data detecting means responsive to the read data signal for detecting data in the read data signal, to generate a second detected data signal; and
switch means for selecting either the first detected data signal when the transient detect signal indicates a transient is detected or the second detected data signal to a data processor when the transient detect signal does not indicate a transient is detected.

47. The detection circuit of claim 46 further including a means for attenuating intersymbol interference in the read data signal.

48. The detection circuit of claim 46 wherein the first data detecting means includes filtering means for attenuating low frequency components in the read data signal and a DFE detector.

49. The detection circuit of claim 48 wherein the filtering means has a high pass filter characteristic.

50. The detection circuit of claim 46 wherein the second data detecting means is a Viterbi detector.

51. The detection circuit of claim 46 wherein the second data detecting means is disabled during the transient.

52. The detection circuit of claim 46 wherein the transient detecting means delays a predetermined time period after the transient before resetting the transient detect signal to indicate no transient is detected.

53. A method of detecting data in a read data signal generated by a head of a perpendicular recording system, comprising the steps of:
a) monitoring the read data signal for a transient;
b) attenuating low frequency components in the read data signal such that a filtered data signal is generated; and
c) detecting data
in the filtered data signal if a transient is detected in step (a); or
in the read data signal if a transient is not detected in step (a) to generate a detected data signal.

54. The method of claim 53 further including the step of attenuating intersymbol interference in the read data signal.

55. The method of claim 53 further including the step of converting the read data signal to digitized data.

56. A computer program of detecting data in a read data signal generated by a head of a perpendicular recording system, comprising the steps of:
a) monitoring the read data signal for a transient;
b) attenuating low frequency components in the read data signal such that a filtered data signal is generated; and
c) detecting data
in the filtered data signal if a transient is detected in step (a); or
in the read data signal if a transient is not detected in step (a) to generate a detected data signal.

57. The computer program of claim 56 further including the step of attenuating intersymbol interference in the read data signal.

58. The computer program of claim 56 further including the step of
converting the read data signal to digitized data.

59. A perpendicular recording system, comprising:
a perpendicular recording head that generates a read data signal including at least one of data and transients;
a transient detector that detects at least one of the transients and that generates a transient detect signal;
a first path comprising a filter and a first data detector responsive to the filter;
the filter to generate a filtered data signal in which low frequency components of the read data signal are attenuated;
the first data detector, operable for detecting data in the filtered data signal, to generate a first detected data signal;
a second path including a second data detector, operable for detecting data in the read data signal, to generate a second detected data signal; and
a switch, controllable in response to the transient detect signal, to select either the first detected data signal when the transient detect signal indicates a transient is detected or the second detected data signal to a data processor when the transient detect signal does not indicate a transient is detected.

60. The perpendicular recording system of claim 59 further comprising a forward equalizer for attenuating intersymbol interference in the read data signal.

61. The perpendicular recording system of claim 59 wherein the first data detector is a DFE detector.

62. The perpendicular recording system of claim 59 wherein the second data detector is a Viterbi detector.

63. The perpendicular recording system of claim 59 wherein the filter has a high pass filter characteristic.

64. The perpendicular recording system of claim 59 wherein the filter has a 1-D filter characteristic.

65. The perpendicular recording system of claim 59 wherein the second data detector is disabled during the transient.

66. The perpendicular recording system of claim 59 wherein the first data detector is a DFE detector;
wherein the second data detector is a Viterbi detector; and
wherein the data filter has a high pass filter characteristic.

67. A method of operating a perpendicular recording system, comprising:
detecting data in a read data signal generated by a perpendicular recording head;

monitoring the read data signal for a transient;
attenuating low frequency components in the read data signal such that a filtered data signal is generated;
detecting data in the filtered data signal; and
generating a first detected data signal from the filtered data signal;
detecting data in the read data signal; and
generating a second detected data signal from the read data signal; in response to detecting the transient, generating a transient detect signal; and
selecting either the first detected data signal or the second detected data signal based upon the transient detect signal.

68. The method of claim 67 further including the step of attenuating intersymbol interference in the read data signal.

69. The method of claim 67 further including the step of converting the read data signal to digitized data.

70. The method of claim 67 further including the step of decoupling the read data signal from the first detector during a transient.

71. A perpendicular recording system, comprising:
perpendicular recoding means for generating a read data signal including data and transients;
transient detecting means for detecting at least one of the transients and for generating a transient detect signal;
first data detecting means responsive to the read data signal, for attenuating low frequency components of the read data signal and detecting data in the read data signal, to generate a first detected data signal;
second data detecting means responsive to the read data signal for detecting data in the read data signal, to generate a second detected data signal; and
switch means for selecting either the first detected data signal when the transient detect signal indicates a transient is detected or the second detected data signal when the transient detect signal does not indicate a transient is detected.

72. The detection circuit of claim 71 further including means for attenuating intersymbol interference in the read data signal.

73. The detection circuit of claim 71 wherein the first data detecting means includes filtering means for attenuating low frequency components in the read data signal and a DFE detector.

74. The detection circuit of claim 73 wherein the filtering means has a high pass filter characteristic.

75. The detection circuit of claim 71 wherein the second data detecting means is a Viterbi detector.

76. The detection circuit of claim 71 wherein the second data detecting means is disabled during the transient.

77. The detection circuit of claim 71 wherein the transient detecting means delays a predetermined time period after the transient before resetting the transient detect signal to indicate no transient is detected.

* * * * *

UNITED STATES PATENT AND TRADEMARK OFFICE
CERTIFICATE OF CORRECTION

PATENT NO.        : 6,995,932 B1                                    Page 1 of 1
APPLICATION NO. : 10/612400
DATED             : February 7, 2006
INVENTOR(S)       : Runsheng He It is certified that error appears in the above-identified patent and that said Letters Patent is hereby corrected as shown below:

|  |  |
|---|---|
| Column 1, Line 8: | Delete "May 5, 2001" and insert --May 7, 2001-- |
| Column 4, Line 64: | Delete "qqqdata" and insert --data-- |
| Column 5, Line 58: | Delete "obtain" and insert --obtained-- |
| Col. 6, Claim 10, Line 47: | Delete "and" after "signal;" |
| Col. 6, Claim 10, Line 50: | Delete "and" after "signal;" |
| Col. 8, Claim 33, Line 31: | Delete "and" after "signal;" |
| Col. 8, Claim 33, Line 34: | Delete "and" after "signal;" |
| Col. 11, Claim 67, Line 4: | Delete "and" after "signal;" |
| Col. 11, Claim 67, Line 7: | Delete "and" after "signal;" |
| Col. 11, Claim 71, Line 22: | Delete "recoding" and insert --recording-- |

Signed and Sealed this

Twenty-ninth Day of August, 2006

JON W. DUDAS
*Director of the United States Patent and Trademark Office*